United States Patent
Do (10) Patent No.: US 9,298,752 B2
(45) Date of Patent: Mar. 29, 2016

(54) FACILITATING DATA MIGRATION BETWEEN DATABASE CLUSTERS WHILE THE DATABASE CONTINUES OPERATING

(71) Applicant: Dropbox, Inc., San Francisco, CA (US)

(72) Inventor: Cuong Do, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 159 days.

(21) Appl. No.: 14/010,215

(22) Filed: Aug. 26, 2013

(65) Prior Publication Data

US 2015/0058289 A1 Feb. 26, 2015

(51) Int. Cl.
*G06F 17/30* (2006.01)
*G06F 9/48* (2006.01)

(52) U.S. Cl.
CPC .......... *G06F 17/303* (2013.01); *G06F 17/3038* (2013.01); *G06F 9/4856* (2013.01); *G06F 17/30079* (2013.01); *G06F 17/30578* (2013.01)

(58) Field of Classification Search
CPC .................... G06F 17/30079; G06F 17/30578; G06F 9/4856
USPC ......... 707/611, 658, 825, 782, 655, 661, 657; 711/165, 161, 162, 112, 114
See application file for complete search history.

(56) References Cited

U.S. PATENT DOCUMENTS

| | | | | |
|---|---|---|---|---|
| 5,564,037 A * | 10/1996 | Lam | ............................ | 711/161 |
| 6,108,748 A * | 8/2000 | Ofek et al. | .................... | 711/112 |
| 6,240,486 B1 * | 5/2001 | Ofek et al. | .................... | 711/112 |
| 6,336,134 B1 * | 1/2002 | Varma | ............................ | 709/205 |
| 6,356,977 B2 * | 3/2002 | Ofek et al. | .................... | 711/112 |
| 6,598,134 B2 * | 7/2003 | Ofek et al. | .................... | 711/162 |
| 8,171,236 B2 * | 5/2012 | Jacobs | ............... | G06F 11/0712 711/153 |
| 8,327,086 B2 * | 12/2012 | Jacobs | ............... | G06F 11/0712 711/153 |
| 8,347,031 B2 * | 1/2013 | Taguchi | ............... | G06F 3/0613 711/114 |
| 8,386,501 B2 * | 2/2013 | Cahill | ............... | G06F 17/30575 707/756 |
| 8,417,737 B2 * | 4/2013 | Hopmann | ......... | G06F 17/30297 707/803 |
| 8,458,696 B2 * | 6/2013 | Park | ....................... | G06F 9/455 711/165 |
| 8,667,066 B1 * | 3/2014 | Havemose | ............ | G06F 11/203 370/230 |
| 8,799,599 B2 * | 8/2014 | Nunez et al. | .................. | 711/162 |
| 2006/0129513 A1 * | 6/2006 | Nakatani | ............... | G06F 3/0605 |
| 2008/0104349 A1 * | 5/2008 | Maruyama et al. | ........... | 711/165 |
| 2010/0070722 A1 * | 3/2010 | Otani | .................... | G06F 3/0607 711/162 |
| 2011/0238775 A1 * | 9/2011 | Wu | .................... | G06F 17/30233 709/213 |
| 2012/0011519 A1 * | 1/2012 | Ganesh | ........................ | 718/105 |
| 2012/0110237 A1 * | 5/2012 | Li | ........................ | G06F 9/45558 711/6 |
| 2012/0221790 A1 * | 8/2012 | Nunez et al. | .................. | 711/114 |
| 2013/0268932 A1 * | 10/2013 | Park | ....................... | G06F 9/455 718/1 |
| 2014/0019415 A1 * | 1/2014 | Barker | .................. | G06F 17/303 707/643 |

FOREIGN PATENT DOCUMENTS

WO    WO 9709676 A1 *    3/1997    .............. G06F 12/00

* cited by examiner

*Primary Examiner* — Frantz Coby
(74) *Attorney, Agent, or Firm* — Park, Vaughan, Fleming & Dowler LLP (57) ABSTRACT

A system for migrating data items from a source cluster to a destination cluster in a database system. During operation, while the database continues to process live database traffic, the system records a current position in an operation log for the database, wherein the operation log comprises a sequential record of operations applied to the database. Next, the system retrieves data items from the source cluster, and inserts the copies of the retrieved data items into the destination cluster. The system also applies a sequence of updates, starting from the recorded position in the operation log, to the copies of the data items in the destination cluster. Finally, after the sequence of updates is applied, the system performs a cut-over operation that diverts the live database traffic from the data items on the source cluster to the copies of the data items on the destination cluster.

20 Claims, 5 Drawing Sheets

FACILITATING DATA MIGRATION BETWEEN DATABASE CLUSTERS WHILE THE DATABASE CONTINUES OPERATING

BACKGROUND

1. Field

The disclosed embodiments generally relate to techniques for improving performance in database systems. More specifically, the disclosed embodiments relate to a technique for migrating data items from a source cluster to a destination cluster in a database system while the database system continues to process live database traffic.

2. Related Art

As the popularity of a web-based service increases, the service may need to expand its data storage infrastructure to process a larger volume of requests. This expansion typically involves migrating a large amount of data from one database cluster to another. For example, the migration can involve moving half of the user accounts from an original cluster to a new cluster. This enables the new cluster to service requests in parallel with the original cluster, thereby enabling the system to process a larger volume of requests. This performance improvement gained by using multiple database clusters is particularly significant because requests directed to a single database cluster often become bottlenecked waiting for cluster-level write-locks to be released. This waiting time often results in a user-perceived latency, which can adversely affect the user's satisfaction with the service.

The task of migrating data within a database is commonly encountered, and many tools exist that facilitate this process. However, existing data-migration tools typically cause a significant downtime for the database system, and this downtime is unacceptable for many web-based services that need to be highly available, such as services associated with financial transactions, email services or search services.

BRIEF DESCRIPTION OF THE FIGURES

Table 1 presents exemplary asynchronous code that copies data items from a source collection to a destination collection in accordance with the disclosed embodiments.

Table 2 presents exemplary asynchronous code that uses gevent to copy data items from a source collection to a destination collection in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments relate to a system that migrates data items from a source cluster to a destination cluster in a database system. During operation, while the database continues to process live database traffic, the system records a current position in an operation log for the database, wherein the operation log comprises a sequential record of operations applied to the database. Next, the system retrieves data items from the source cluster, and inserts the copies of the retrieved data items into the destination cluster.

Because the copying operations are taking place while the database system is operating, the data continues to change during the copying process. More specifically, for a given set of data items to be copied, multiple insertions, updates, and deletions can take place during the copying process. In order to make the data items consistent on the destination cluster, the system applies a sequence of updates (starting from the recorded position in the operation log) to the copies of the data items in the destination cluster. Some of these updates may have already been applied to the data items before the data items were copied to the destination cluster, so these previously applied updates will be reapplied. Other updates may have been applied to the data items after the data items were copied to the destination cluster; these updates will be applied for the first time to the data items on the destination cluster. At the completion of this migration process, the resulting data items on the destination cluster will be consistent with the data items in the source cluster as long as: (1) all of the updates are applied sequentially to the copies of the data items on destination cluster; and (2) the updates are insertions, deletions or complete overwrites of data items.

In some embodiments, the system uses multiple processes (also referred to as "threads") to perform the migration operation for respective subsets of the data items in parallel. This can significantly speed up the migration process because the parallel threads can perform multiple copying operations at the same time. Moreover, internal database execution mechanisms typically cause a process that is executing for a long time to get a smaller share of the system's processing resources, which causes the process to execute more slowly. By splitting a large copying operation into a number of smaller copying operations, this execution slowdown (that arises when a thread is executing for a long period of time) can be avoided, and the copying operation will require less time.

Finally, after the sequence of updates is applied, the system performs a cut-over operation that diverts the live database traffic from the data items on the source cluster to the copies of the data items on the destination cluster.

Before we describe details of the above-described system, we first describe the structure of an exemplary online content-management system 120, which includes such a database system, and which operates within a content-management environment 105.

Content-Management Environment

Figure 1:
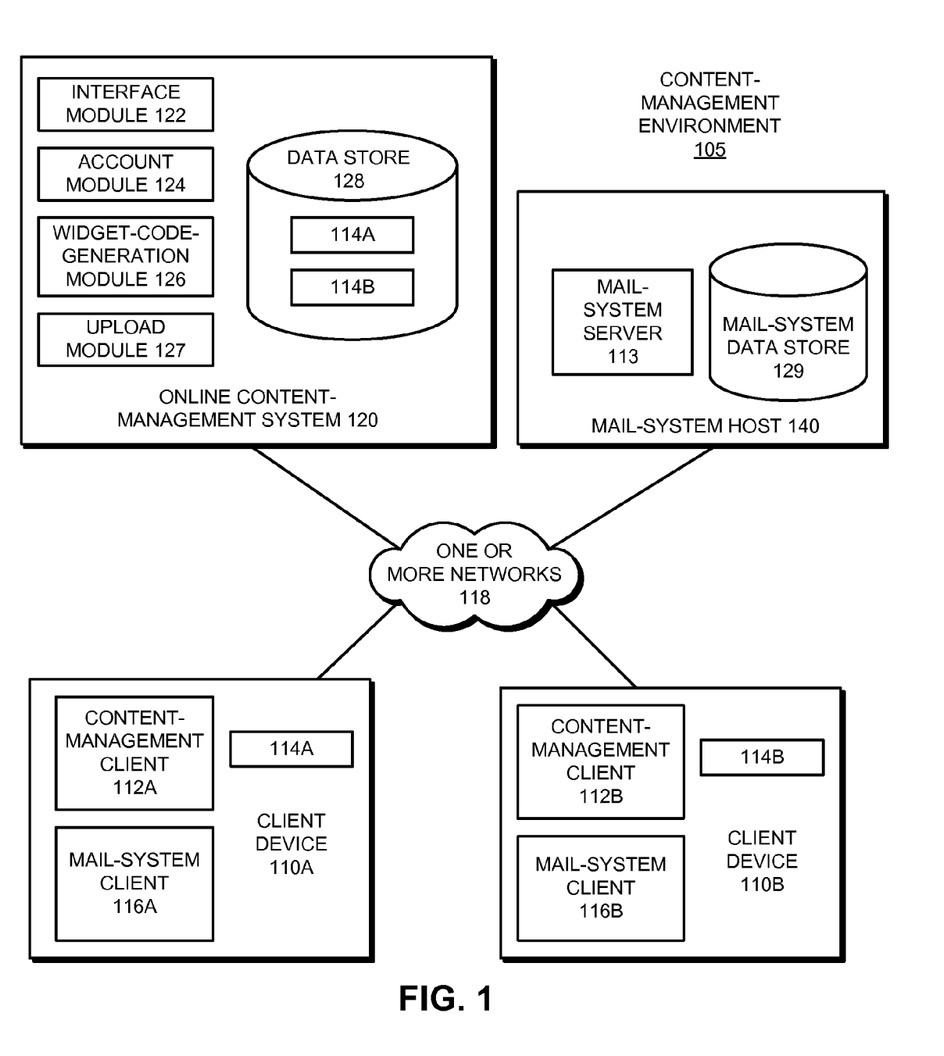
FIG. 1 illustrates a content-management environment in accordance with the disclosed embodiments.

FIG. 1 shows content-management environment 105 according to various embodiments. As may be understood from this figure, content-management environment 105 includes a plurality of client devices 110A and 110B (collectively 110), mail-system server 113 (which resides on mail-system host 140 and is associated with mail-system data store 129) and online content-management system 120, which are all interconnected by one or more networks 118. (Although the exemplary system illustrated in FIG. 1 relates to an email service, the data-migration techniques described in this disclosure can be more generally applied to improve performance for any type of web-based service, and is not meant to be limited to an email service.)

For purposes of illustration, the embodiments that appear in FIG. 1 show a mail system comprising mail-system server 113 and mail-system clients 116A-116B (collectively 116). Various aspects of client devices 110, mail-system server 113 and content-management system 120 are discussed below.

Client Devices

In various embodiments, each client device 110A and 110B may selectively execute a respective content-management client application 112A and 112B (collectively 112) (also referred to as a "content-management client"), which may be used to manage "contents items" stored within content-management system 120, wherein a content item can include a file, folder or other data item. Note that, in some embodiments, synchronized copies of content items 114A and 114B may be kept on content-management system 120, as well as on each respective client device 110. In some embodiments, client devices 110 may provide a file-browser type interface (not shown) for directly manipulating the content items stored on content-management system 120 without maintaining a local copy. Client devices 110 may also include mail-system clients 116A and 116B for receiving and sending messages associated with mail-system server 113. Note that these mail-system clients 116A and 116B can be web-based or native-client-based mail-system clients.

While only two client devices 110A and 110B are shown in FIG. 1 for purposes of clarity, it should be understood by those skilled in the relevant field that many client devices 110 may simultaneously connect through network(s) 118 to mail-system server 113 and content-management system 120 at any given time. Examples of suitable client devices 110 include, but are not limited to, a desktop computer; mobile computing devices, such as a laptop or a tablet; and handheld devices, such as a smartphone (e.g., an IPHONE®, BLACKBERRY®, or ANDROID™-based smartphone). Each client device 110 may store a local, synched copy of one or more content items from within content-management system 120, and the content items may be stored in any suitable file format. When content-management client 112 presents content items that are stored within the file storage system to a user, the content items may be arranged in folders and the folders themselves may be arranged in other folders, or in any other arbitrary arrangement supported by content-management system 120, as determined by the user. However, one of skill in the art should understand in light of this disclosure that each user's file storage architecture may be considerably different from the next, and in some instances, the file storage architecture may be implemented to maximize storage and file retrieval efficiency.

Content-Management System

Content-management system 120 stores content items and manages access to those content items via client devices 110. Content-management system 120 and its components may be implemented using any appropriate hardware and software for file serving, storage, and retrieval functions. For example, content-management system 120 may be implemented in the form of a single server or multiple servers.

In various embodiments, content-management system 120 includes interface module 122, account module 124, widget-code-generation module 126, upload module 127, and data store 128. Each of these elements of content-management system 120 is discussed below.

Content-Management System—Interface Module

In particular embodiments, interface module 122 may facilitate content item access and content item storage between content-management system 120 and client devices 110. Interface module 122 may receive content items from and send content items to client devices 110 consistent with the user's preferences for sharing content items. Interface module 122 may act as the counterpart to a client-side file-explorer style user interface that allows a user to manipulate content items directly stored on content-management system 120. In some embodiments, software operating on client devices 110 may integrate network-stored content items with the client's local file system to enable a user to manipulate network-stored content items through the same user interface (UI) used to manipulate content items on the local file system, e.g., via a file explorer, file finder or file browser application. As an alternative or supplement to the client-side file-explorer interface, interface module 122 may provide a web interface for client devices 110 to access (e.g., via a suitable mail-system client 116) and allow a user to manipulate content items stored within content-management system 120. In this way, the user can directly manipulate content items stored within content-management system 120.

Content-Management System—Data Store

In various embodiments, data store 128 may store content items such as those uploaded using client devices 110, or using any other suitable computing device. In the embodiment shown in FIG. 1, client device 110A, which is associated with a first user, is shown as locally storing at least one content item 114A, and client device 110B, which is associated with a second user, is shown as locally storing at least one content item 114B. As shown in FIG. 1, copies of the locally stored content items are maintained in data store 128 of content-management system 120.

In various embodiments, data store 128 may maintain information identifying the user, information describing the user's file directory, and other information in a file journal that is maintained for each user. In some embodiments, the file journal may be maintained on content-management system 120, and in other embodiments, a file journal (e.g., a "server-side file journal") may be maintained on content management system 120 and locally on each client device 110. In various embodiments, the file journal may be used to facilitate the synchronization of the various copies of a particular content item that are associated with a user's account.

As a particular example, in the embodiment shown in FIG. 1, the system may be configured so that any changes that are made to content item 114A on particular client device 110A may also be automatically reflected in the copy of content item 114A stored within content-management system 120. Similarly, any changes that are made to content item 114A on content-management system 120 may also be automatically reflected in the copy of content item 114A stored on client device 110A.

Content-Management System—Account Module

In particular embodiments, account module 124 may track content items stored in data store 128 and entries in the server-side file journal for each content item. As users grant file access permissions to other users, account module 124 may update the server-side file journal associated with each relevant user in data store 128. Account module 124 may also track client devices 110 that are associated with each user's account. For example, a user may want to share all their content items among their desktop computer, tablet computer, and mobile device. To make such a sharing arrangement seamless to the user, the user's single account on content-management system 120 may be associated with each of the user's respective client devices. In some embodiments, an application running on each respective client device 110 may help to coordinate synchronization of content items on the client device with corresponding versions of the content items within the user's account in content-management system 120, and also with corresponding versions of the content items stored on the user's various other client devices.

Content-Management System—Widget-Code-Generation Module

In particular embodiments, widget-code-generation module 126 may be configured to generate code that may be used, for example, to create a message-attachment widget on a remote mail-system client. In particular embodiments, this code may be HTML code that may be pasted into a mail-system client to create the message-attachment widget.

Migrating Data Between Database Clusters

Figure 2:
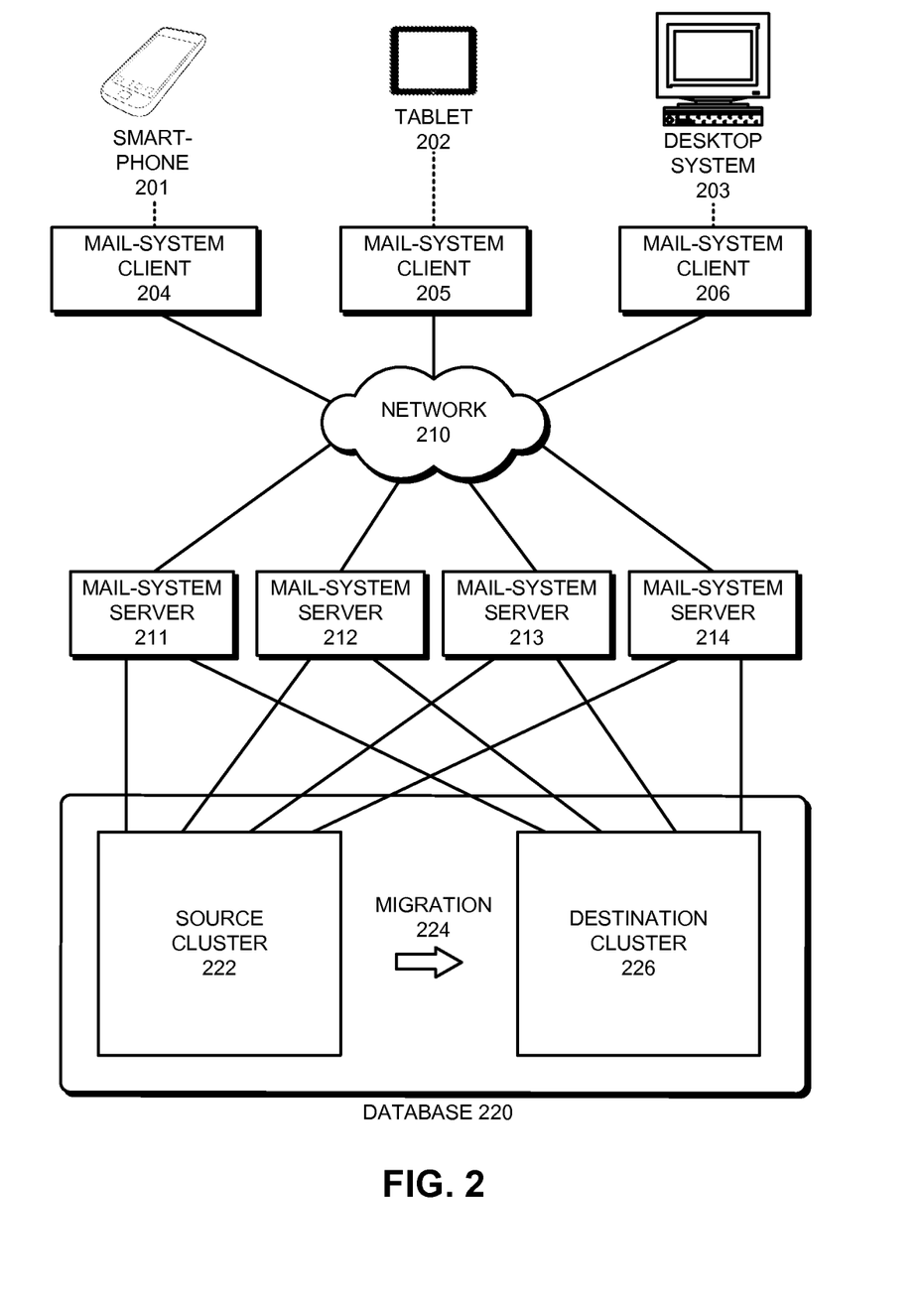
FIG. 2 illustrates how data is migrated between database clusters in an exemplary email system in accordance with the disclosed embodiments.

FIG. 2 illustrates how data is migrated between database clusters for an exemplary email backend system in accordance with the disclosed embodiments. More specifically, FIG. 2 illustrates a number of client devices, such as smartphone 201, tablet 202 and desktop system 203, which execute mail-system clients 204, 205 and 206, respectively. Mail-system clients 204, 205 and 206 communicate through a network 210 with associated instances of mail-system server 211-214. Note that these mail-system server instances are analogous to mail-system server 113 illustrated in FIG. 1.

During operation, mail-system servers 211-214 make requests to database 220. (In some embodiments, database 220 is an instance of the MongoDB™ supported by 10gen of Palo Alto, Calif.) Referring to the system illustrated in FIG. 1, if the system includes a separate mail-system host 140, database 220 can be part of mail-system data store 129 within mail-system host 140. Alternatively, database 220 can be part of data store 128, within online content-management system 120. (In general, note that mail-system related data can be stored in either mail-system data store 129 within mail-system host 140, or in data store 128 for online content-management system 120.)

At the start of the migration process, mail-system servers 211-214 are directing a stream of live database traffic to data items located on source cluster 222. During the migration process, a portion of the data items on source cluster 222 are migrated 224 to destination cluster 226. While this migration operation 224 is taking place, requests from servers 211-214 for these migrated data items continue to be directed to source cluster 222. After the migration operation is complete, the migrated data is verified. Next, after the verification is complete, a "cut-over" operation is performed so that requests for the migrated data items are directed to the destination cluster.

Note that the system can use different hardware units to support different clusters. In this way, a given hardware unit can be specially tuned to service requests for specific types of data items that are associated with the hardware unit.

Database Cluster Structure

Figure 3:
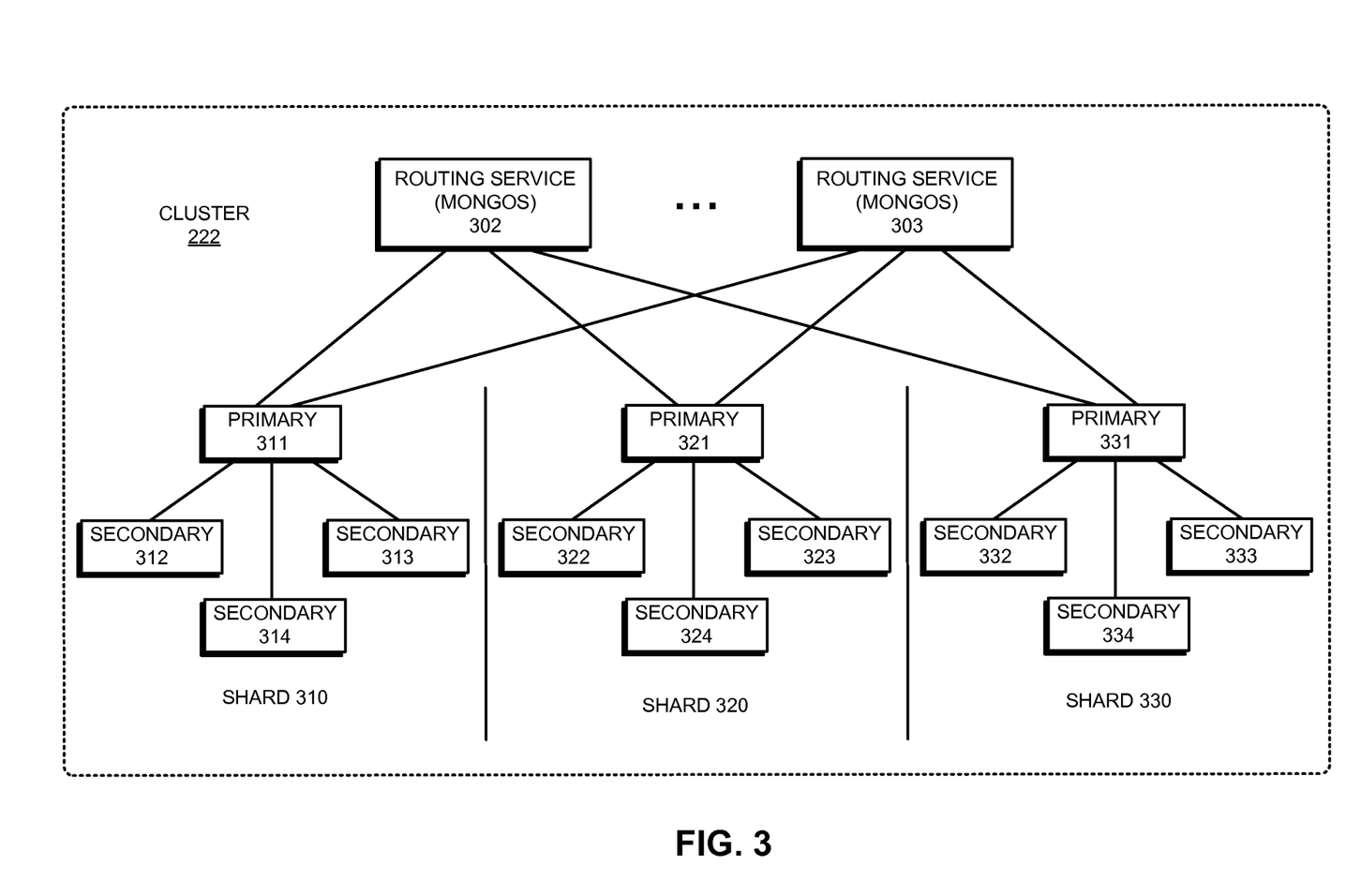
FIG. 3 illustrates the structure of an exemplary database cluster in accordance with the disclosed embodiments.

FIG. 3 illustrates the structure of exemplary database cluster 222 in accordance with the disclosed embodiments. As illustrated in FIG. 3, cluster 222 includes one or more routing service modules 302-303, such as the "mongos" routing service which is part of the MongoDB™. A given routing service module 302 processes queries from the application layer, determines the locations of associated data in a sharded cluster, and then directs the queries to the determined locations. During this process, the routing service module 302 can communicate with a configuration server to determine where the requested data lives. Routing service module 302 then fetches the data from the shards, aggregates the data, and returns it in a specific form (e.g., JSON form).

As illustrated in FIG. 3, cluster 222 comprises a number of "shards," including shards 310, 320 and 330. Moreover, each of shards 310, 320 and 330 is organized hierarchically with one or more (replica set) primaries 311, 321 and 331 that accept both read and write operations. Each of the primaries is associated with one or more (replica set) secondaries that replicate the primary's data set and only accept read operations. More specifically, primary 311 is associated with secondaries 312-314, primary 321 is associated with secondaries 322-324, and primary 331 is associated with secondaries 332-334.

Existing data-migration tools typically use a primary as the source for the migration data. This places a burden on the primary, which continues to service user requests while the migration operations are taking place. The disclosed embodiments address this issue by using the secondaries as the source of the migration data. This enables the corresponding primaries to continue servicing user requests. It also facilitates performing migration operations in parallel by accessing multiple replica set secondaries simultaneously.

Migration Process

Figure 4:
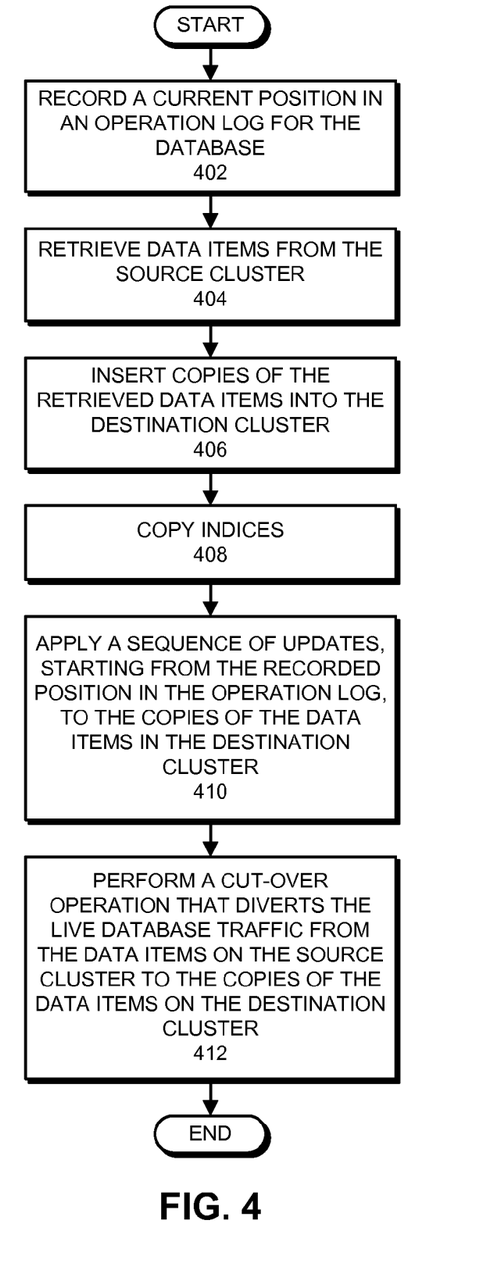
FIG. 4 presents a flow chart illustrating how data items are migrated in an operating database system in accordance with the disclosed embodiments.

FIG. 4 presents a flow chart illustrating how data items are migrated within an operating database system in accordance with the disclosed embodiments. At the start of this process, while the database continues to service live database traffic, the system records a current position in an operation log for the database (step 402). Note that the operation log contains a sequential record of operations applied to the database.

Next, the system retrieves data items from the source cluster (step 404), and inserts the copies of the retrieved data items into the destination cluster (step 406). In some embodiments, the copying operations are performed by multiple processes executing in parallel. More specifically, for each shard, the system creates a process to do the copying. This process first records the operation log (oplog) position, which can involve recording the sequence number and associated update operation, as in step 402 above. The process then retrieves the IDs of data items to be copied from the shard. (Note that each shard can be associated with a subset of IDs which is not necessarily a range.) The process then retrieves data items based on batches of IDs (e.g., several thousand IDs). To optimize performance, the system can make one request for a large number of IDs to reduce round trip communications with the database. The process then inserts the data items into the destination cluster.

At this point, the system can also copy associated indices, which are used to facilitate efficient accesses to specific fields in the data items, from the source cluster to the destination cluster (step 408).

Next, the system applies a sequence of updates, starting from the recorded position in the operation log, to the copies of the data items in the destination cluster (step 410).

Finally, after the sequence of updates is applied and the data items on the destination cluster are verified, the system performs a cut-over operation, which diverts the live database traffic from the data items on the source cluster to the copies of the data items on the destination cluster (step 412).

Asynchronous Updates

Figure 5:
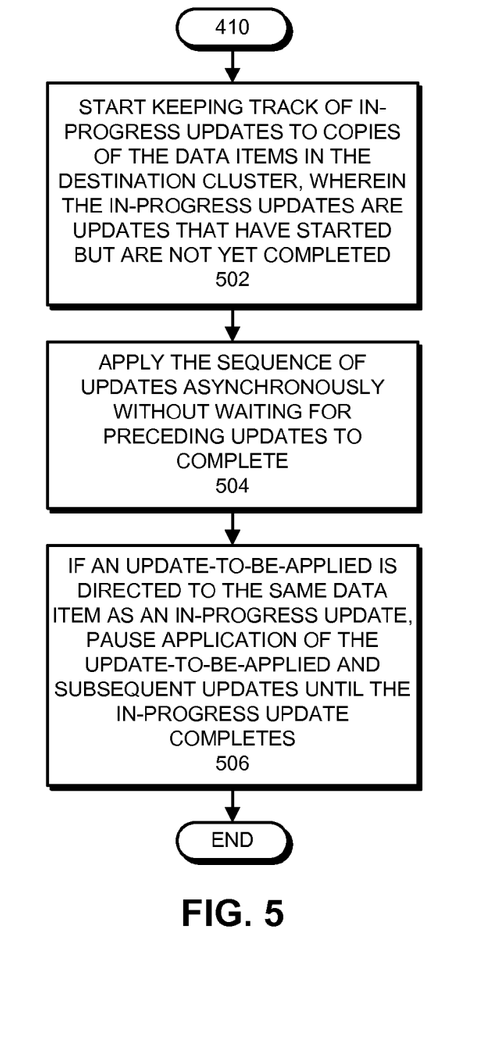
FIG. 5 presents a flow chart illustrating how asynchronous updates are applied to copies of the data items in accordance with the disclosed embodiments.

FIG. 5 presents a flow chart illustrating how asynchronous updates are applied to copies of the data items in accordance with the disclosed embodiments. (This flow chart provides more details about the operation that takes place in step 410 in the flow chart illustrated in FIG. 4.) At the start of this process, the system keeps track of in-progress updates to copies of the data items in the destination cluster, wherein the in-progress updates are updates that have started but are not yet completed (step 502).

Next, the system applies the sequence of updates asynchronously without waiting for preceding updates to complete (step 504). While applying these updates, if an update-to-be-applied is directed to the same data item as an in-progress update, the system pauses application of the update-to-be-applied and subsequent updates until the in-progress update completes (step 506). Note that the asynchronous updates will not cause any problems so long as the data item is not being modified by two different operations at the same time. This can be guaranteed if the system waits to apply an update until any preceding in-progress update to the same data item are complete.

The system can use a simple lookup structure, such as a hash table, to keep track of in-progress updates. When an update is initiated, an entry for the update is inserted into the lookup structure, wherein the entry can be looked up based on an identifier for the data item. When the update completes, it is no longer "in-progress," and the entry is removed from the lookup structure. Before a new update is initiated, the system performs a lookup based on an identifier for the associated data item. If the data item is associated with an in-progress update, the system waits until the in-progress update completes before initiating the update.

Also note that if the sequence of updates is applied asynchronously, it may be difficult to determine precisely when all of the updates are complete. In some embodiments, the system examines a last set of changes that were applied to the source cluster and looks to see whether the updates have been applied to the destination cluster. If so, some of the preceding updates might still be in-progress, so the system waits for a certain amount of time (a few minutes) to ensure that all of the preceding updates have completed.

Verification

Figure 6:
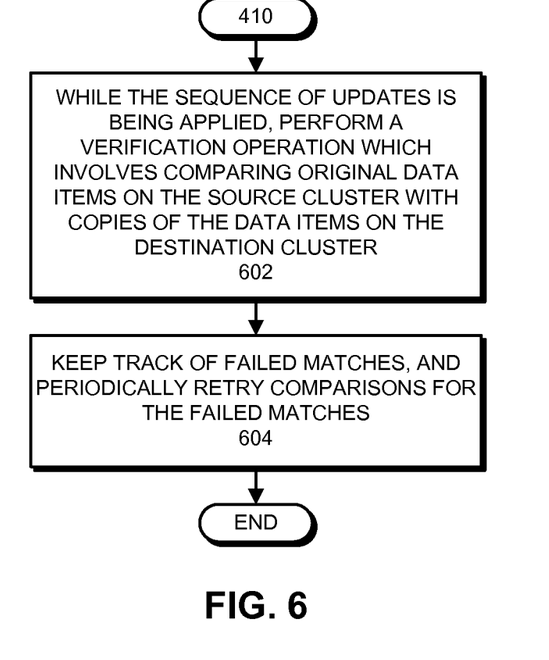
FIG. 6 presents a flow chart illustrating how a verification operation is performed in accordance with the disclosed embodiments.

FIG. 6 presents a flow chart illustrating how a verification operation is performed in accordance with the disclosed embodiments. While the sequence of updates is being applied in step 410, the system starts performing the verification operation, which involves comparing original data items in the source cluster with copies of the data items in the destination cluster (step 602). During this process, the system keeps track of failed matches and periodically retries comparisons for the failed matches with an increasing interval between retries (step 604). If a failed match is not rectified after a certain number of retries, the associated failed update can be logged. This allows a manual tool to be used at a later time to selectively re-verify the failed update and to take remedial actions if necessary.

Exemplary Implementation

In an exemplary configuration, the above-described system is implemented using the Python™ programming language and MongoDB™. For example, the exemplary configuration can be implemented using a single Python process and asynchronous MongoDB™ queries. One of the more popular Python libraries for supporting concurrent execution is gevent. gevent operates by patching standard Python modules, such as the "socket" module, to perform asynchronous operations. The beauty of gevent is that it enables a programmer to write asynchronous code that reads simply, like synchronous code. Traditionally, asynchronous code to copy data items (e.g., documents) between two collections might look like the code that appears in Table 1 below, which uses callbacks.

In contrast, by using gevent, the system can be implemented using code having no callbacks that reads sequentially as appears in Table 2 below. Note that the code in Table 2 simply copies data items (more specifically "documents") from a source MongoDB collection to a destination, based on their _id fields, which are the unique identifiers for each MongoDB document. The copy_documents( ) function delegates the work of copying documents to greenlets (which are like threads but are cooperatively scheduled) that run copy_document( ). When a greenlet performs a blocking operation, such as any request to MongoDB, it yields control to any other greenlet that is ready to execute. Because greenlets all execute in the same thread and process, there generally is no need to provide any type of inter-greenlet locking

TABLE 1

```
import asynclib
def copy_documents(source_collection, destination_collection, _ids,
callback):
    """
    Given a list of _id's (MongoDB's unique identifier field for each
    document),copies the corresponding documents from the source collection
    to the destination collection
    """
    def _copy_documents_callback(...):
        if error_detected( ):
            callback(error)
    # copy documents, passing a callback function that will handle
errors
    # and other notifications
    for _id in _ids:
        copy_document(source_collection, destination_collection, _id,
        _copy_documents_callback)
    callback( )
def copy_document(source_collection, destination_collection, _id,
    callback):
    """
    Copies document corresponding to the given id from the source to the
    destination
    """
    def _insert_doc(doc):
        """
        callback that takes the document read from the source
collection
        and inserts it into destination collection
```

TABLE 1-continued

```
    """
    if error_detected( ):
        callback(error)
    destination_collection.insert(doc) # another MongoDB operation
# find the specified document asynchronously, passing a callback to
receive
# the retrieved data
source_collection.find_one({'$id': _id}, callback=_insert_doc)
callback( )
```

This gevent technique is able to achieve much faster performance than existing "thread worker pool" or "process worker pool" approaches. Moreover, combining gevent with worker processes—one for each shard—yields a linear increase in performance. Note that the key to using worker processes efficiently is to eliminate as much inter-process communication (IPC) as possible.

TABLE 2

```
import gevent
gevent.monkey.patch_all( )
def copy_documents(source_collection, destination_collection,
    _ids):
    """
    Given a list of _id's (MongoDB's unique identifier field for
    each document), copies the corresponding documents from the
    source collection to the destination collection
    """
    # compares the source and destination's version of the document
    # with the given _id in a separate greenlet, which will run
    # copy_document( )
    for _id in _ids:
        gevent.spawn(copy_document, source_collection,
            destination_collection, _id)
def copy_document(source_collection, destination_collection, _id):
    """
    Copies document corresponding to the given _id from the source
    to the destination.
    """
# both of the following function calls block without gevent; with
# gevent they simply cede control to another greenlet while
# waiting for Mongo to respond
source_doc = source_collection.find one({'$id': _id})
destination_collection.insert(source_doc) # another MongoDB op
```

Extensions

Although the disclosed embodiments relate to migrating data for an email system including mail servers that access an email-related database, the same techniques can be applied to migrating data associated with any type of service, or more generally migrating any type of data that is being updated by a stream of transactions. For example, the same techniques can be applied to migrating data on a database that is accessed by back-end servers for any type of web-related service, such as a searching service or an online banking service.

Moreover, although the migration process is described as taking place between clusters within a single database system, the same techniques can be applied to migrating data between different database systems that can possibly reside at different locations. More specifically, the migration process can involve moving data items between databases sited at different geographic locations.

The migration process can also take place within a database cluster. More specifically, the migration can involve moving data items between different servers or disk drives that are part of the same database cluster.

Although the migration operation is described as taking place from a first location (the source cluster) to a second location (the destination cluster), in general the migration operation can involve copying data items between one or more source locations and one or more destination locations. For example, the migration operation can involve copying data items from a single source location to multiple destination locations. In another example, the migration operation involves copying data items from multiple source locations to a single destination location. In yet another example, the migration operation involves copying data items from multiple source locations to multiple destination locations.

In some embodiments, the original data items at the source location are eventually deleted, so the data items only exist at the destination location. In this case, the migration operation essentially "moves" the data items from the source location to the destination location. In another embodiment, the original data items are not deleted from the source location, so the migration operation essentially "copies" the data items from the source location to the destination location. In this case the updates continue to be applied to both copies of the data items after the migration is complete. Note that this type of copying operation can be used to facilitate fault tolerance by generating multiple copies of data items at different locations.

In an alternative embodiment, during the migration process the system stops applying updates to the copies of the data items at the source location. The updates are instead stored in a source cache at the source location, which enables the database to continue to read and modify copies of the updates in the source cache. After the data items are copied to the destination location, the updates are applied to the copies of the data items at the destination location, before the cut-over operation can take place. Note that the system may have to temporarily pause operation while these updates are being applied. Alternatively, the updates can be propagated to a destination cache at the destination location while they are being applied to the source cache at the source location. This can eliminate much of the delay involved in communicating the updates to the destination location because the updates are continually communicated to the destination cache while they are being applied to the source cache. In this way, the cut-over operation can simply involve directing subsequent updates to the destination cache, and can also enable the contents of the destination cache to be applied to the underlying copies of the data items at the destination location.

The above-described migration technique can generally be applied to any type of general-purpose or special-purpose database system. For example, the technique can be applied to a database system that is based on a hierarchical database model, a relational database model, an object database model, or an object-relational database model. Moreover the database can run on general-purpose computational hardware, such as a general-purpose server, a desktop computer or a portable computing device. Alternatively, the database can run on special-purpose hardware for supporting a database system, including processing units, interconnection networks, and storage devices designed to process database transactions.

The migration operation can also involve converting the data items between different data formats. The system can also support manual "data cleaning" operations to improve data quality, eliminate redundant or obsolete data and meet the specific data-format requirements of the destination system.

The system can also support a number of variations of the verification operation described above with respect to FIG. 6. In the simplest case, the system verifies that each copy of a data item at the destination location matches a corresponding original data item at the source location. If the data items include associated checksums (or more generally "message digests"), the system can use the checksums to ensure that the data items were communicated without error from the source location to the destination location. Also, to save time, instead of comparing complete data items from the source location and the destination location, the system can instead compare checksums for the data items. This can dramatically speed up the comparison process, because checksums are typically much smaller than their associated data items.

In some embodiments, the data items are not stored in a database system, but are simply maintained within data structures by instances of an application which execute at the source location and the destination location. In this case, the migration operation involves communicating the data items between an instance of the application at the source location and an instance of the application at the destination location.

The above-described system can also be used to migrate different types of data items. For example, the data items can comprise: documents, emails, web pages, database records, database tables, images, videos, financial records, numerical data and textual data.

The above-described migration system can be implemented in a number of different ways. In some embodiments, the system is implemented by functions within a database system. In other embodiments, the system comprises a special-purpose migration tool that is external to the database system, and that makes calls into the database system to perform the migration operation and to apply the associated updates. In other embodiments, the migration code is incorporated into an application that accesses the data items. For example, the migration code can be incorporated into an email application that accesses the database.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method, comprising:
    while a database continues to process live database traffic, performing the following operations:
        receiving a request to migrate a set of data items from a source cluster in the database to a destination cluster in the database;
        recording a current position in an operation log for the database, wherein the operation log records a sequential record of operations that are applied to the source cluster subsequent to receiving the migration request;
        copying the set of data items from the source cluster to the destination cluster in parallel with continuing to process live database traffic for the set of data items at the source cluster;
        applying a sequence of updates, starting from the recorded position in the operation log, to the set of data items that was copied to the destination cluster; and
        after the sequence of updates is applied, performing a cut-over operation that diverts the live database traffic for the set of data items to the destination cluster, wherein prior to the cut-over operation the source cluster continues to directly receive and handle requests for the set of data items, wherein subsequent to the cut-over operation live database traffic for the set of data items is diverted to the destination cluster.

2. The method of claim 1,
    wherein the set of data items that are migrated to the destination cluster comprise a subset of the data items in the source cluster;
    wherein subsequent to the cut-over operation the source cluster continues to process live database traffic for a distinct set of un-migrated data items that are stored in the source cluster;
    wherein processing live database traffic for the database in parallel on both the source cluster and the destination cluster enables the database to process a larger volume of requests.

3. The method of claim 1, wherein applying the sequence of updates includes applying the sequence of updates asynchronously by:
    tracking in-progress updates to the set of data items that have been copied to the destination cluster, wherein the in-progress updates are sequential updates from the operation log that are being applied to the copied set of data items on the destination cluster but have not yet completed;
    applying the sequence of updates asynchronously on the destination cluster without waiting for preceding updates to complete; and
    upon detecting that a pending update applies to a same data item as an in-progress update, pausing application of the pending and subsequent updates until the in-progress update completes.

4. The method of claim 1, further comprising performing a verification operation to verify that the data items have been successfully migrated from the source cluster to the destination cluster, wherein the verification operation comprises comparing data items that were updated on the source cluster while the set of data items were being copied with copies of the data items on the destination cluster to ensure that the changes in the operation log were applied to the copy of the set of data items on the destination cluster.

5. The method of claim 4,
    wherein the verification operation takes place in parallel with applying the sequence of updates to the copied set of data items in the destination cluster; and
    wherein ensuring that the copied set of data items matches the original data items comprises keeping track of failed matches, and periodically retrying comparisons for the failed matches.

6. The method of claim 1, wherein the method further comprises copying one or more indices, which are used to access fields in the data items, from the source cluster to the destination cluster.

7. The method of claim 1,
    wherein the database includes one or more replica set primaries that accept both read and write operations;
    wherein each replica set primary is associated with one or more replica set secondaries that replicate a primary's data set and only accept read operations; and
    wherein copying the data items from the source cluster comprises copying the data items in parallel from a set of two or more replica set secondaries that all store the set of data items to the destination cluster, wherein using the set of replica set secondaries to copy the set of data items enables the corresponding replica set primaries to service other requests for the set of data items while simultaneously performing migration operations in parallel via the multiple replica set secondaries.

8. The method of claim 1, wherein an update can include one or more of:
- an insertion of a data item;
- an update to a data item; and
- a deletion of a data item.

9. A system, comprising:
- a database server within a database; and
- a migration module within the database server, wherein the migration module includes a memory storing instructions for controlling a processor to perform a migration operation, the migration operation comprising:
- while the database continues to process live database traffic performing the following operations:
  - receiving a request to migrate a set of data items from a source cluster in the database to a destination cluster in the database;
  - recording a current position in an operation log for the database, wherein the operation log records a sequential record of operations that are applied to the source cluster subsequent to receiving the migration request;
  - copying the set of data items from the source cluster to the destination cluster in parallel with continuing to process live database traffic for the set of data items at the source cluster;
  - applying a sequence of updates, starting from the recorded position in the operation log, to the set of data items that was copied to the destination cluster; and
  - after the sequence of updates is applied, performing a cut-over operation that diverts the live database traffic for the set of data items to the destination cluster, wherein prior to the cut-over operation the source cluster continues to directly receive and handle requests for the set of data items, wherein subsequent to the cut-over operation live database traffic for the set of data items is diverted to the destination cluster.

10. The system of claim 9,
- wherein the set of data items that are migrated to the destination cluster comprise a subset of the data items in the source cluster;
- wherein subsequent to the cut-over operation the source cluster continues to process live database traffic for a distinct set of un-migrated data items that are stored in the source cluster;
- wherein processing live database traffic for the database in parallel on both the source cluster and the destination cluster enables the database to process a larger volume of requests.

11. The system of claim 9, wherein the migration module is configured to apply the sequence of updates asynchronously by:
- tracking in-progress updates to the set of data items that have been copied to the destination cluster, wherein the in-progress updates are sequential updates from the operation log that are being applied to the copied set of data items on the destination cluster but have not yet completed;
- applying the sequence of updates asynchronously on the destination cluster without waiting for preceding updates to complete; and
- upon detecting that a pending update applies to a same data item as an in-progress update, pausing application of the pending and subsequent updates until the in-progress update completes.

12. The system of claim 9, wherein the migration module is additionally configured to perform a verification operation to verify that the data items have been successfully migrated from the source cluster to the destination cluster, wherein the verification operation comprises comparing data items that were updated on the source cluster while the set of data items were being copied with copies of the data items on the destination cluster to ensure that the changes in the operation log were applied to the copy of the set of data items on the destination cluster.

13. The system of claim 12,
- wherein the migration module is configured to perform the verification operation in parallel with applying the sequence of updates to the copied set of data items in the destination cluster; and
- wherein while ensuring that the copied set of data items matches the original data items, the migration module is configured to keep track of failed matches, and periodically retry comparisons for the failed matches.

14. The system of claim 9,
- wherein the database includes one or more replica set primaries that accept both read and write operations;
- wherein each replica set primary is associated with one or more replica set secondaries that replicate a primary's data set and only accept read operations; and
- wherein while copying the data items from the source cluster, the migration module is configured to copy the data items in parallel from a set of two or more replica set secondaries that all store the set of data items to the destination cluster, wherein using the set of replica set secondaries to copy the set of data items enables the corresponding replica set primaries to service other requests for the set of data items while simultaneously performing migration operations in parallel via the multiple replica set secondaries.

15. A non-transitory computer-readable storage medium storing instructions that when executed by a computer cause the computer to perform a method, comprising:
- while a database continues to process live database traffic, performing the following operations:
  - receiving a request to migrate a set of data items from a source cluster in the database to a destination cluster in the database;
  - recording a current position in an operation log for the database, wherein the operation log records a sequential record of operations that are applied to the source cluster subsequent to receiving the migration request;
  - copying the set of data items from the source cluster to the destination cluster in parallel with continuing to process live database traffic for the set of data items at the source cluster;
  - applying a sequence of updates, starting from the recorded position in the operation log, to the set of data items that was copied to the destination cluster; and
  - after the sequence of updates is applied, performing a cut-over operation that diverts the live database traffic for the set of data items to the destination cluster, wherein prior to the cut-over operation the source cluster continues to directly receive and handle requests for the set of data items, wherein subsequent to the cut-over operation live database traffic for the set of data items is diverted to the destination cluster.

16. The non-transitory computer-readable storage medium of claim 15,
- wherein the set of data items that are migrated to the destination cluster comprise a subset of the data items in the source cluster;

wherein subsequent to the cut-over operation the source cluster continues to process live database traffic for a distinct set of un-migrated data items that are stored in the source cluster;

wherein processing live database traffic for the database in parallel on both the source cluster and the destination cluster enables the database to process a larger volume of requests.

17. The non-transitory computer-readable storage medium of claim 15, wherein applying the sequence of updates includes applying the sequence of updates asynchronously by:

tracking in-progress updates to the set of data items that have been copied to the destination cluster, wherein the in-progress updates are sequential updates from the operation log that are being applied to the copied set of data items on the destination cluster but have not yet completed;

applying the sequence of updates asynchronously on the destination cluster without waiting for preceding updates to complete; and upon detecting that a pending update applies to a same data item as an in-progress update, pausing application of the pending and subsequent updates until the in-progress update completes.

18. The non-transitory computer-readable storage medium of claim 15, further comprising performing a verification operation to verify that the data items have been successfully migrated from the source cluster to the destination cluster, wherein the verification operation comprises comparing data items that were updated on the source cluster while the set of data items were being copied with copies of the data items on the destination cluster to ensure that the changes in the operation log were applied to the copy of the set of data items on the destination cluster.

19. The non-transitory computer-readable storage medium of claim 18, wherein the verification operation takes place in parallel with applying the sequence of updates to the copied set of data items in the destination cluster; and wherein ensuring that the copied set of data items matches the original data items comprises keeping track of failed matches, and periodically retrying comparisons for the failed matches.

20. The non-transitory computer-readable storage medium of claim 15, wherein the database includes one or more replica set primaries that accept both read and write operations;

wherein each replica set primary is associated with one or more replica set secondaries that replicate a primary's data set and only accept read operations; and wherein copying the data items from the source cluster comprises copying the data items in parallel from a set of two or more replica set secondaries that all store the set of data items to the destination cluster, wherein using the set of replica set secondaries to copy the set of data items enables the corresponding replica set primaries to service other requests for the set of data items while simultaneously performing migration operations in parallel via the multiple replica set secondaries.

* * * * *